(12) United States Patent
Atieh

(10) Patent No.: US 6,788,712 B2
(45) Date of Patent: Sep. 7, 2004

(54) MULTIPLE WAVELENGTH LASER SOURCE

(75) Inventor: Ahmad Atieh, Nepean (CA)

(73) Assignee: Oprel Technologies, Inc., Ottawa (CA)

(*) Notice: Subject to any disclaimer, the term of this patent is extended or adjusted under 35 U.S.C. 154(b) by 142 days.

(21) Appl. No.: 09/813,853

(22) Filed: Mar. 22, 2001

(65) Prior Publication Data

US 2001/0050788 A1 Dec. 13, 2001

Related U.S. Application Data

(60) Provisional application No. 60/191,732, filed on Mar. 24, 2000.

(30) Foreign Application Priority Data

Mar. 24, 2000 (CA) .............................. 2302105

(51) Int. Cl.[7] .............................. H01S 3/067
(52) U.S. Cl. .............................. 372/6; 372/94; 359/333; 359/341.1
(58) Field of Search .............................. 372/6, 94, 99, 372/102; 359/333, 341.1

(56) References Cited

U.S. PATENT DOCUMENTS

| 4,962,987 A | * 10/1990 | Doran | 350/96.5 |
| 5,243,609 A | 9/1993 | Huber | 372/19 |
| 5,323,404 A | 6/1994 | Grubb | 372/6 |
| 5,557,442 A | * 9/1996 | Huber | 359/333 |
| 5,646,759 A | 7/1997 | Lichtman et al. | 359/138 |
| 5,655,039 A | * 8/1997 | Evans | 372/6 |
| 5,778,014 A | * 7/1998 | Islam | 372/6 |
| 5,910,962 A | 6/1999 | Pan et al. | 372/6 |
| 6,101,024 A | 8/2000 | Islam et al. | 359/334 |
| 6,389,195 B1 | * 5/2002 | Havstad et al. | 385/27 |
| 6,404,541 B2 | * 6/2002 | Atieh | 359/341.1 |

OTHER PUBLICATIONS

"Broadband Tunable Single Frequency Diode–Pumped Erbium Doped Fibre Laser" Cochlain et al., Electroncis Letters, Jan. 16, 1992 vol. 28, No. 2 pp. 124–126.

* cited by examiner

Primary Examiner—Haissa Philogene
Assistant Examiner—James Menefee
(74) Attorney, Agent, or Firm—Teitelbaum & MacLean; Neil Teitelbaum; Doug MacLean

(57) ABSTRACT

A simple and flexible WDM laser source is disclosed using a loop erbium-doped fiber amplifier (LEDFA) configuration. The loop serves as a mirror and as an amplification medium. The laser cavity was made from the loop mirror and a set of fiber Bragg gratings (FBGs) which select the proper lasing wavelengths. The FBGs can be placed either in parallel or in series at the output of the loop configuration. Optical attenuators are placed in front of the FBG to control the flatness of the laser source output and determine the required lasing condition for each wavelength to avoid competition of the different lasing wavelengths. This configuration is flexible for adding any number of wavelengths as long as enough amplified spontaneous emission (ASE) is generated in the loop. Signal to noise ratio as high as 55-dB can be achieved.

15 Claims, 2 Drawing Sheets

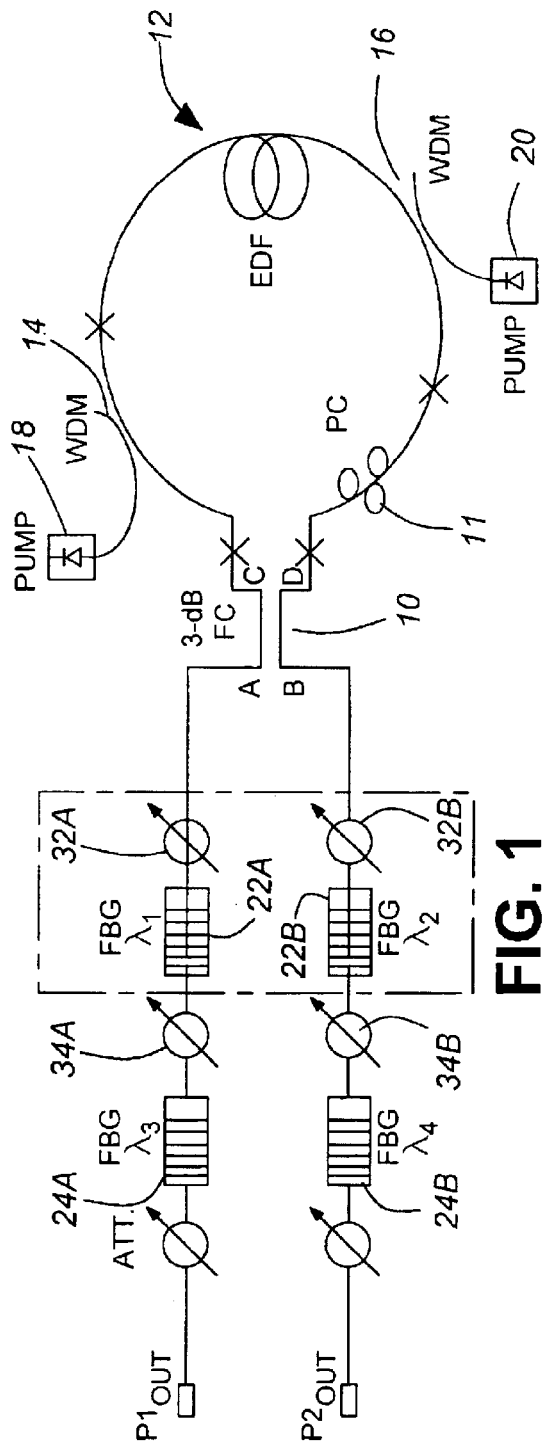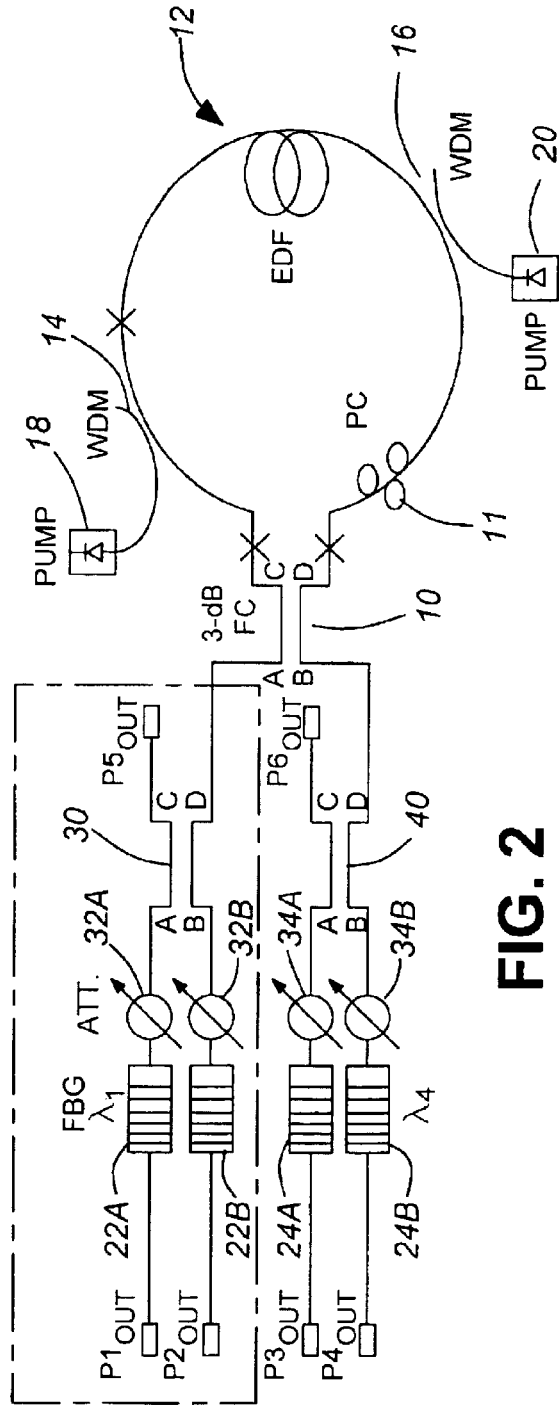
FIG. 1
FIG. 2

MULTIPLE WAVELENGTH LASER SOURCE

This application claims priority of U.S. provisional application No. 60/191,732 filed Mar. 24, 2000 and Canadian application No. 2,302,105 filed Mar. 24, 2000.

FIELD OF THE INVENTION

This invention generally relates to laser sources and in particular to lasers sources suitable for wavelength-division multiplexed optical communications systems.

BACKGROUND

Wavelength Division Multiplexing, WDM and Dense Wavelength Division Multiplexing, DWDM optical transmission systems require light from multiple laser sources to match the International Telecommunications Union, ITU, channel spacing. In previous work this has been done with individual lasers tuned separately to the channel spacings.

Cochlain and Mears disclosed an example of a laser source producing a single wavelength in an article entitled "Broadband Tunable Single Frequency Diode Pumped Erbium Doped Fiber Laser", Electronics Letters, Vol. 28, No. 2, pp. 124–126, 1992. Cochlain and Mears disclose a laser that comprises a loop mirror formed by a 3-dB coupler and an erbium-doped fiber having its ends connected to respective ports of the coupler via an isolator and a wavelength selective coupler (WSC), the latter coupling energy from a pump into the erbium-doped fiber. The WSC is used to pump 1480 nm light into the loop mirror. A polarization controller between the WSC and the 3-dB coupler controls the passage of amplified spontaneous emission (ASE) into the coupler, while the isolator blocks the ASE from reaching the other port of the coupler. A third port of the 3-dB coupler is connected to a grating by way of a second polarization controller while the fourth port delivers the output signal. Rotation of the grating selects the individual wavelength at which the laser will lase. The ASE will be reflected by the grating back through the 3-dB coupler and will pass, via the isolator, around the loop to appear at the output of the laser. The grating reflects substantially all of the light reaching it, so the output signal can be extracted from only the one point in the system, namely from the fourth port of the coupler. The device cannot readily be adapted for multiple wavelength use and so the common practice would be to use a number of these devices, each one tuned to a different wavelength, to provide the multiple wavelengths required for WDM or DWDM. However, this approach is expensive since it requires duplication of components to provide multiple wavelengths.

The present invention seeks to overcome these disadvantages and to this end provides a laser source capable of operating at multiple wavelengths.

SUMMARY

In accordance with the present invention, there is provided a multiple wavelength laser source comprising a loop mirror formed by a loop of active fiber and a first coupler, preferably a 3-dB (50:50) coupler, the fiber being connected between two ports of the coupler, at least one pump means for injecting pump energy into the loop of active fiber; and a plurality of wavelength-selective reflection devices having different selected wavelengths and coupled to at least a third port of the first coupler;

wherein each reflection device is for reflecting into the fiber loop a first portion, having a selected wavelength, of amplified spontaneous emission produced by the active fiber, and directing a second portion of the amplified spontaneous emission produced by the active fiber, to an output port.

Each reflection device will reflect back into the loop mirror ASE at its own particular selected wavelength. Consequently, the laser source will lase at each of the different wavelengths of the plurality of reflection devices, thereby producing output light at a plurality of different wavelengths which can be used for WDM or DWDM.

One or more of the reflection devices may transmit the second portion to the output port. Additionally or alternatively, one or more of the reflection devices may reflect the second portion to the output port, conveniently by way of an additional coupler.

In one embodiment of the invention, the plurality of reflection devices are in series between the first coupler and the output port and each reflects the first portion of ASE back to the loop mirror and transmits the second portion to the output port.

In another embodiment of the invention, the plurality of the reflection devices are arranged in parallel. Specifically, a first plurality of wavelength-selective reflection devices may be coupled to a corresponding port of the first coupler by way of a second coupler, an output port of the first coupler being coupled to an output port of the laser, each reflection device reflecting both the first portion and the second portion of ASE to the second coupler and the second coupler directing a portion of the energy to the loop mirror and another portion to the associated output port. One or more of the reflection devices coupled to the second coupler may transmit a third portion of the ASE to an associated output port. Analogously, at least one other plurality of wavelength-selective reflection devices may be coupled to another port of the first coupler by way of another coupler in an arrangement similar to the one described above.

Various types of reflection devices meeting the requirements of the invention may be employed. Fiber Bragg gratings (FBGs) are one choice. Tunable filters with partially reflective and partially transmissive mirrors are another possibility.

Preferably, but not necessarily, the first portion and the second portion each comprise about 50 per cent of the emission energy.

The laser source may comprise a plurality of attenuators, each between the fiber loop and one of the reflection devices. The attenuators may be used to adjust the amount of ASE reflected and hence control the amplitude of the laser output signal at the corresponding selected wavelength. In addition, they are used to control lasing modes competition in the loop. The attenuators may be adjusted to "flatten" the output spectrum. The number of reflection devices coupled to each port of the 3-dB coupler need not be the same.

In accordance with another aspect of the present invention, there is provided a laser source system for producing multiple sets of lasing wavelengths, said system comprising:

laser source combining means for combining output from a plurality of multiple wavelength laser sources, each multiple wavelength laser source comprising:
  a loop mirror means, said loop mirror means comprising:
    a loop of active fiber; and
    a splitter/coupler means that is coupled, via a first and a second port, to both ends of the loop of active fiber;
  at least one pump means for injecting pump energy into the loop of active fiber; and
  a plurality of wavelength-selective reflecting devices, said devices having different selected wavelengths and coupled to at least a third port of the splitter/coupler means;

wherein each reflecting device is for reflecting a first portion of amplified spontaneous emission, supplied by the loop of active fiber, and directing a second portion of the amplified spontaneous emission, supplied by the loop of active fiber, to an output port.

BRIEF DESCRIPTION OF THE DRAWINGS

FIG. 1 illustrates, as a first embodiment of the invention, a laser source having a plurality of gratings, with attenuators, in series;

FIG. 2 illustrates, as a second embodiment of the invention, a laser source having a plurality of gratings in parallel;

DETAILED DESCRIPTION OF THE INVENTION

Figure 3:
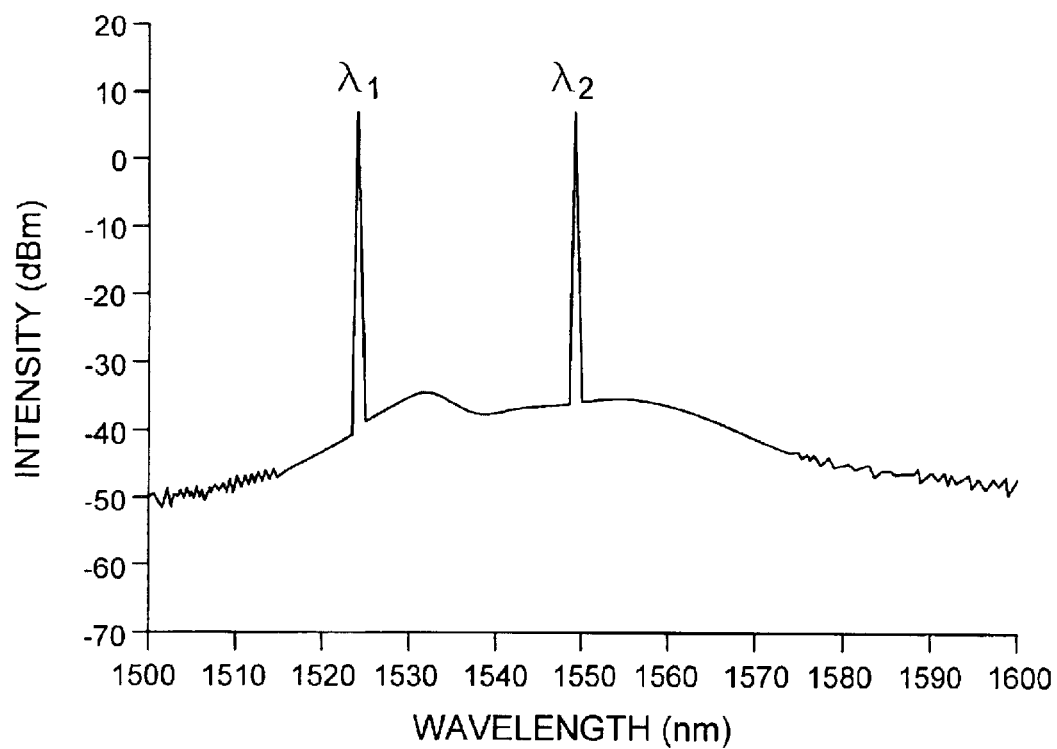
FIG. 3 illustrates the spectrum of the laser output from the first four output ports of the laser source of FIG. 2.

In the drawings, identical or corresponding items in the different Figures have the same reference number.

Referring first to FIG. 1, a laser source comprises a loop mirror formed by a 3-dB fiber coupler 10 having four ports, A, B, C and D, and a loop of active fiber 12 doped with any rare earth, preferably erbium-doped fiber, EDF, with its ends connected to ports C and D, respectively, through wavelength-selective couplers 14 and 16 that are connected also to pump sources (lasers) 18 and 20, respectively.

WDM couplers are used to combine the pump energy at 980 nm and the amplified signal at 1550 nm inside the EDF loop 12. Using 3-dB couplers to combine the 980 nm pump energy and the 1550 nm laser output is problematic and therefore it is more appropriate to use a WDM coupler, inside of the EDF loop, to combine these light signals.

A polarization controller 11 is placed in the loop to divide amplified spontaneous emission (ASE) generated by the pump source to the output terminals of the coupler 10.

Port A of the coupler 10 is coupled to a first output port $P1_{OUT}$ by a plurality of fiber Bragg gratings, FBGs, 22A, 24A, ..., having characteristic wavelengths $\lambda_1, \lambda_3, \ldots$, respectively, in series. Port B of the coupler 10 is coupled to a second output port $P2_{OUT}$ by a second plurality of FBGs, 22B, 24B, ..., having characteristic wavelengths $\lambda_2, \lambda_4, \ldots$, respectively, all in series. Each of the FBGs 22A, 24A, 22B, 24B, ..., is selected to reflect, preferably, about 50% of the light incident upon it at the selected wavelength and transmit the remainder.

Attenuators 32A, 34A ... are coupled in series with each FBG 22A, 24A ..., and attenuators 32B, 34B ... are coupled in series with each FBG 22B, 24B ... to balance the energy available between the output wavelengths. Since ASE has a non-flat output function, the energy imbalance is inherent.

In operation, the pump energy from pump sources 18 and 20 produces ASE in the EDF 12. Assuming a symmetric configuration, 50 per cent of the ASE will appear at each of the ports C and D of the 3-dB coupler 10 and will be coupled to ports A and B. Further, setting the attenuators 32A, 34A, ..., to zero attenuation, FBG 22A will reflect 50 per cent of the light leaving port A so that it re-enters the loop mirror and transmits the remainder to FBG 24A which, in a similar manner, will reflect 50 per cent of the ASE at its own selected wavelength and transmit the remainder of the ASE and other light including any lasing frequency. All of the other gratings/attenuators in series with the first output port $P1_{OUT}$ will operate in a similar manner. Once lasing conditions have been established, the output signal appearing at output port $P1_{OUT}$ will comprise all the lasing wavelengths $\lambda_1, \lambda_3, \ldots$ of the gratings 22A, 24A and so on.

The same applies to the second output port $P2_{OUT}$. The ASE light leaving port B of the 3-dB coupler 10 will be reflected and transmitted in a similar manner by the fiber gratings 22B, 24B ... in series with second output port $P2_{OUT}$, so that the light leaving output port $P2_{OUT}$ comprises the wavelengths $\lambda_2, \lambda_4 \ldots$ of gratings 22B, 24B and so on.

For most WDM or DWDM applications, it is desirable for the amplitude of the output signal to be the same at each wavelength. Consequently, the attenuators previously mentioned may be used to adjust the amount of light reflected by the respective FBG, and hence the amplitude of the output light at the corresponding wavelength. There is competition for the ASE in EDF 12 to induce lasing at the chosen wavelengths. The ASE energy is shared between the competing lasing wavelengths.

The laser source illustrated in FIG. 2 is based on a loop mirror formed by a 3-dB (first) fiber coupler 10 having four, ports A, B, C and D, and a loop of active fiber 12, preferably erbium-doped, with its ends connected to ports C and D, respectively, through wavelength-selective couplers 14 and 16 that are also connected to pump sources (lasers) 18 and 20, respectively. The laser source in FIG. 2 differs from that shown in FIG. 1 in that the FBGs are not connected in series to the port A of fiber coupler 10 but are instead connected in parallel. Thus, FBGs 22A and 22B are connected to ports A and B of a second 3-dB coupler 30 by way of attenuators 32A and 32B, respectively. FBGs 24A and 24B are connected to ports A and B of a third 3-dB coupler 40 by way of attenuators 34A and 34B, respectively. The transmissive ports of FBGs 22A, 22B, 24A, and 24B are coupled to four output ports $P1_{OUT}$, $P2_{OUT}$, $P3_{OUT}$ and $P4_{OUT}$, respectively. Ports D of couplers 30 and 40 are connected to ports A and B, respectively, of the 3-dB coupler 10, and ports C of couplers 30 and 40 are connected to fifth and sixth output ports $P5_{OUT}$ and $P6_{OUT}$, respectively.

In operation, the ASE leaving the coupler 10 will be split again by couplers 30 and 40 before reaching FBGs 22A, 22B, 24A and 24B. Each of these gratings will reflect about 50 per cent of the ASE at its own selected wavelength and transmit the remainder, as before. Consequently, when lasing conditions have been established, the light appearing at ports $P1_{OUT}$, $P2_{OUT}$, $P3_{OUT}$, and $P4_{OUT}$ will have wavelengths $\lambda_1, \lambda_2, \lambda_3, \lambda_4, \ldots$ and the ASE. FIG. 3 shows the measured output at terminal $P1_{OUT}$ when two gratings are used in the setup. Note that the signal to noise ratio is about 45 dB.

Figure 4:
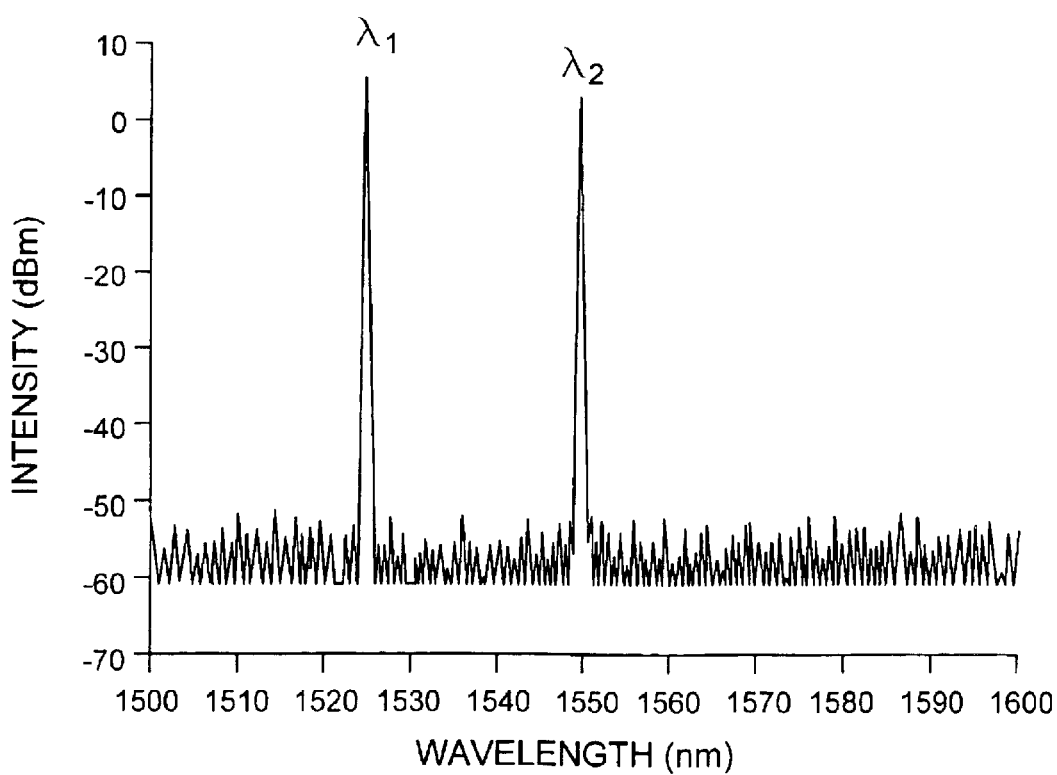
FIG. 4 illustrates the spectrum of the laser output from fifth and sixth output ports of the laser source of FIG. 2.

The light leaving the output ports $P5_{OUT}$ and $P6_{OUT}$ will be reflected by the gratings and will pass through the attenuators again, as compared with the light leaving the first output ports $P1_{OUT}$, $P2_{OUT}$, $P3_{OUT}$, and $P4_{OUT}$. Consequently, the light at output port s $P5_{OUT}$ and $P6_{OUT}$ have a better signal-to-noise ratio (better than 55 dB) compared to the other output terminals, as illustrated in FIG. 4. The reason that the signal-to-noise ratio is improved at the output ports $P5_{OUT}$ and $P6_{OUT}$ is that the signals contains less ASE, because the gratings reflects only the signal to couplers 30, and 40, while they passes ASE to the output ports $P1_{OUT}$, $P2_{OUT}$, $P3_{OUT}$, and $P4_{OUT}$.

It should be appreciated that, if only two wavelengths were needed, one of the couplers 30 and 40, and its associated pair of gratings, could be omitted. Conversely, additional wavelengths could be obtained by adding more couplers and pairs of gratings, in a tree-like configuration. It is also envisaged that the embodiment of FIGS. 1 and 2 could be combined, with some of the parallel branches of the laser source having a series of gratings, or each embodiment of FIGS. 1 and 2 could be repeated more than one time to achieve multiple of DWDM source The attenuators 32A, 32B, 34A and 34B allow the amplitude of the light at each wavelength to be adjusted so that, if desired, they are equal.

Although, in the above-described laser sources, the gratings each reflect about 50 per cent of the selected wavelength light, other proportions could be used.

It is an advantage of the present invention that a multiplicity of wavelengths can be provided using a single active-fiber loop mirror and a grating for each wavelength. Also, the number of wavelengths can be increased simply by adding more fiber gratings, and perhaps increasing pump energy, as appropriate.

What is claimed is:

1. A multiple wavelength laser source comprising:
   a loop mirror comprising a loop of active fiber, and a first coupler having four ports, the loop of active fiber being connected to a first and second port of the first coupler;
   at least one pump means for injecting pump energy into the loop of active fiber remote from the first coupler, thereby generating amplified spontaneous emissions; and
   a plurality of wavelength-selective reflection devices having different selected wavelengths and coupled to at least a third port of the first coupler;
   wherein each reflection device is for reflecting back into the loop of active fiber a first portion, having a selected wavelength, of the amplified spontaneous emission, and directing a second portion of the amplified spontaneous emission away from the loop of active fiber to a first output port, which is optically coupled to at least one of the reflection devices.

2. A laser source as defined in claim 1, wherein the plurality of reflection devices is in series between the first coupler and the first output port.

3. A laser source as defined in claim 1, further comprising an attenuator between the plurality of reflection devices and the third port of the first coupler for adjusting amplitude of light at a selected wavelength.

4. A laser source as defined in claim 1, wherein the first coupler is a 3-dB coupler.

5. The laser source as defined in claim 1, further comprising another plurality of reflection devices connected between a fourth port of the first coupler and another output port.

6. A laser source as defined in claim 1, wherein the plurality of reflection devices is connected in parallel.

7. The laser source of claim 6, further comprising at least one additional output port; wherein at least one additional coupler is disposed between the first coupler and the at least one additional output port; and wherein each reflection device is disposed between the at least one additional coupler and the at least one additional output port.

8. The laser source according to claim 1, further comprising a second output port; wherein the plurality of reflection devices comprises first and second reflection devices connected between first and second ports of a second coupler and the first and second output ports, respectively; and wherein a third port of the second coupler is connected to the third port of the first coupler.

9. The laser source according to claim 8, wherein a fourth port of the second coupler is connected to a third output port.

10. The laser source according to claim 8, further comprising third and fourth reflection devices connected between first and second ports of a third coupler and the third and a fourth output ports, respectively; wherein a third port of the third coupler is connected to the fourth port of the first coupler.

11. The laser source of claim 1 further comprising an adjustable attenuator associated with each reflection device for adjusting amplitude of light reflected or transmitted by the reflection device.

12. A laser source as defined in claim 1 wherein the reflection devices are fiber Bragg gratings.

13. A laser source according to claim 1 wherein the reflection devices are tunable filters with partially reflective mirrors.

14. The laser source according to claim 1, wherein the pump means injects pump energy into the loop of active fiber via a wavelength-selective coupler.

15. A laser source system for producing multiple sets of lasing wavelengths, said system comprising:
    laser source combining means for combining output from a plurality of multiple wavelength laser sources, each multiple wavelength laser source comprising:
    a loop mirror means, said loop mirror means comprising:
        a loop of active fiber; and
        a coupler which is coupled, via a first and a second port, to both ends of the loop of active fiber;
    at least one pump means for injecting pump energy into the loop of active fiber remote from the first coupler, thereby generating amplified spontaneous emissions; and
    plurality of wavelength-selective reflection devices, said devices having different selected wavelengths and coupled to at least a third port of the coupler;
    wherein each reflection device is for reflecting a first portion of the amplified spontaneous emission back into the loop of active fiber, and directing a second portion of the amplified spontaneous emission, away from the loop of active fiber to an output port, which is optically coupled to at least one of the reflection devices.

* * * * *

UNITED STATES PATENT AND TRADEMARK OFFICE
CERTIFICATE OF CORRECTION

PATENT NO. : 6,788,712 B2  Page 1 of 1
DATED : September 7, 2004
INVENTOR(S) : Atieh It is certified that error appears in the above-identified patent and that said Letters Patent is hereby corrected as shown below:

<u>Column 5,</u>
Line 12, after "energy as appropriate.", please insert the following paragraph
-- Numerous other embodiments may be envisioned without departing from the spirit and scope of the present invention. --.

Signed and Sealed this

Twenty-third Day of August, 2005

JON W. DUDAS
*Director of the United States Patent and Trademark Office*